United States Patent
Lagunas

(10) Patent No.: US 10,803,256 B2
(45) Date of Patent: Oct. 13, 2020

(54) SYSTEMS AND METHODS FOR TRANSLATION MANAGEMENT

(71) Applicant: PAYPAL, INC., San Jose, CA (US)

(72) Inventor: Diego Lagunas, San Jose, CA (US)

(73) Assignee: PAYPAL, INC., San Jose, CA (US)

(*) Notice: Subject to any disclaimer, the term of this patent is extended or adjusted under 35 U.S.C. 154(b) by 147 days.

(21) Appl. No.: 15/858,156

(22) Filed: Dec. 29, 2017

(65) Prior Publication Data

US 2019/0205398 A1 Jul. 4, 2019

(51) Int. Cl.
*G06F 40/51* (2020.01)
*G06N 20/00* (2019.01)
*G06F 40/58* (2020.01)

(52) U.S. Cl.
CPC .............. *G06F 40/51* (2020.01); *G06F 40/58* (2020.01); *G06N 20/00* (2019.01)

(58) Field of Classification Search
CPC .... G06F 17/2854; G06F 17/289; G06F 40/51; G06F 40/58; G06N 20/00
See application file for complete search history.

(56) References Cited

U.S. PATENT DOCUMENTS

| | | | |
|---|---|---|---|
| 9,710,429 B1* | 7/2017 | Raghunath | G06F 40/51 |
| 2003/0101044 A1 | 5/2003 | Krasnov | |
| 2004/0059705 A1 | 3/2004 | Wittke et al. | |
| 2009/0030944 A1 | 1/2009 | Ni et al. | |
| 2009/0099835 A1 | 4/2009 | Elliot et al. | |
| 2009/0158137 A1 | 6/2009 | Itycheriah et al. | |
| 2009/0248422 A1 | 10/2009 | Li et al. | |
| 2012/0136648 A1 | 5/2012 | Elliot et al. | |
| 2013/0103695 A1* | 4/2013 | Rarrick | G06F 40/51 707/748 |
| 2013/0144596 A1 | 6/2013 | Lui et al. | |
| 2016/0012124 A1 | 1/2016 | Ruvini et al. | |

(Continued)

OTHER PUBLICATIONS

TRANSIFEX, "Categorizing and Prioritizing Resources," from https://docs.transifex.com/projects/categorizing-and-prioritizing-resources.

(Continued)

*Primary Examiner* — Michelle M Koeth
(74) *Attorney, Agent, or Firm* — Haynes and Boone, LLP

(57) ABSTRACT

Systems and methods for a translation management system include performing a source text collection and translation process. The source text collection and translation process includes collecting, from one or more applications, one or more source texts for translation. Source segments for translation are determined using the one or more source texts. Source text properties associated with the one or more source texts are provided to a machine learning engine. Translation performance requirement predictions associated with the plurality of source segments respectively are generated by the machine learning engine based on the source text properties. A plurality of translation requests associated with the plurality of source segments is provided by the machine learning engine based on the translation performance requirement predictions. One or more translated texts generated in response to executing the plurality of translation requests are received. A translation result storage is updated using the one or more translated texts.

18 Claims, 11 Drawing Sheets

(56) References Cited

U.S. PATENT DOCUMENTS

| | | | |
|---|---|---|---|
| 2016/0098261 A1* | 4/2016 | Habib | G06F 9/454 |
| | | | 717/171 |
| 2016/0103826 A1 | 4/2016 | Lui et al. | |
| 2016/0162478 A1* | 6/2016 | Blassin | G06F 40/58 |
| | | | 706/12 |
| 2019/0068736 A1* | 2/2019 | Naara | H04L 67/02 |

OTHER PUBLICATIONS

Yip, Patrick, "The Secret to Speedy Crowdsourced Translation," Dec. 12, 2013 from www.oneskyapp.com/blog/secret-speedy-crowdsourced-translations/.

Sidler, Samuel, "Translation Project Sorting Ideas," Jul. 20, 2015, from https://make.wordpress.org/meta/2015/07/20/translation-project-sorting-ideas/.

"When content doesn't need to be translated," from https://help.smartling.com/v1.0/docs/when-content-doesnt-need-to-be-translated.

\* cited by examiner

SYSTEMS AND METHODS FOR TRANSLATION MANAGEMENT

TECHNICAL FIELD

The present disclosure generally relates to machine learning and artificial intelligence, and more specifically to a machine learning engine for translation management for application localization.

BACKGROUND

Various types of service providers may provide electronic transaction processing services to users, merchants, other types of businesses, and different entities in different regions using various languages. Localization, the process of adapting applications for a specific region and/or language, often involves translating source texts of those applications. While higher quality translation is desirable, such higher quality translation often requires more computing power, resulting in higher translation cost and time.

Thus, there is a need for an improved translation management system.

Figure 1:
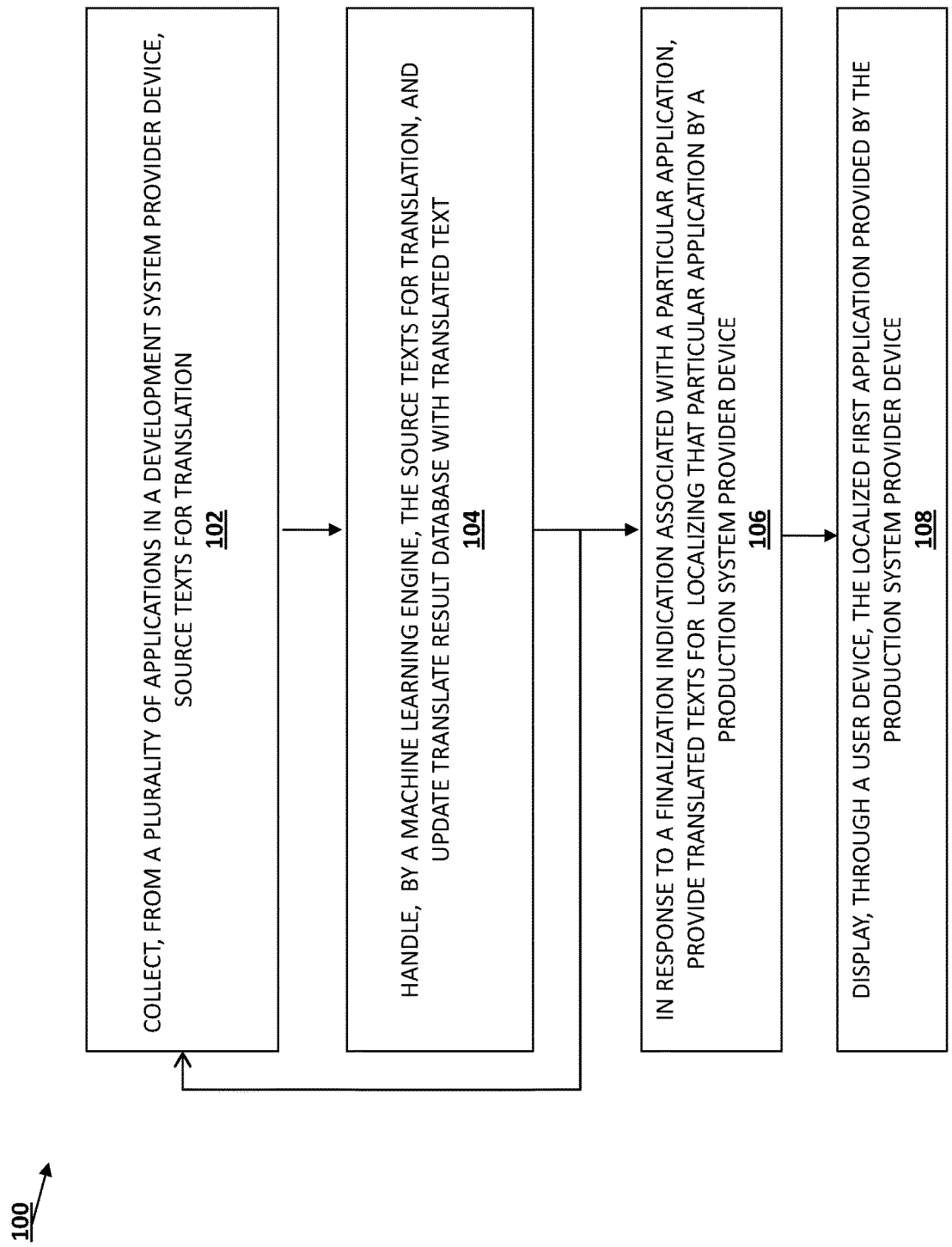
FIG. 1 is a flow chart illustrating an embodiment of a method for translation management for localization.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods for providing translation management that allow a translation management system to generate or maintain a more flattened translation demand over a certain period (e.g., six months, one year, two years, five years). In some embodiments, instead of waiting until source texts are finalized or near finalization to perform a translation, the translation management system continuously collects source texts for translation during a period that the source texts are generated and updated. In those embodiments, the source texts are collected incrementally over that period, and the translation demand provided based on such continuously collected source texts is more flattened and has less fluctuation. Such a more flattened translation demand allows a continuous translation process with consistent human translator allocations, which may improve translation quality and reduce translation cost and time. In some embodiments, the translation management system uses a machine learning engine that learns from data associated with the source texts, and predicts translation quality, cost, and/or time associated with the source texts and associated source segments. The machine learning system may also learn from data associated with potential translators (e.g., including machine translation providers and human translators), and may predict translation quality, cost, and/or time associated with particular translators. The translation management system may perform translation of the source texts including the corresponding source segments according to translation parameters (e.g., allocated translator, translation schedule, translation process parameters) provided by the machine learning engine, thereby achieving optimized translation management.

As discussed above, typically, translation performance requirements include requirements for cost, quality, and time. Translation costs span a huge range depending on various translation requirements. For example, translation using a human translator may cost from twenty cents each word to tens of dollars each word for different industries. On the other hand, translation using automatic translation providers (e.g., using one or more automatic translation tools (e.g., Computer-Aided Translation (CAT), automatic glossary lookup, spell and grammar checkers, translation memories, machine translation)) may improve productivity (throughput), thereby reducing cost and/or time. In some embodiments, a source text is broken down to the smallest source segments (e.g., word, phrase, sentence, and/or any other suitable segment) that may be meaningfully translated (e.g., by a machine translation provider and/or a human translator).

Translation quality may be improved by adjusting the translation process. For example, adding one or more extra review cycles (e.g., by one or more human translators) to the translation process after an initial translation may improve translation quality. Translation quality (e.g., given the same cost and time) may also be affected by translator properties associated with the assigned translator (e.g., a human translator, a machine translation provider, or any suitable automatic translation tool provider). Human translator properties may include skillsets of a particular human translator, and that particular human translator's familiarity with the source texts to be translated. For example, the translation quality may be improved if a human translator more familiar with the source texts (e.g., with the associated subject matter, product, and/or company) is used. As such, reusing the same human translator(s) for related source texts (e.g., source texts for the same subject matter, same product, and/or same company) may increase translation quality without increasing cost and time. Machine translation provider properties may include properties associated with the corresponding machine translation algorithms including, for example, a rule-based algorithm, a statistical algorithm, a hybrid machine translation algorithm, a neural machine translation algorithm, and any other suitable machine translation algorithm.

In some embodiments, a company having translation needs may rely on translation vendors having a large network of human translators (e.g., human translators that are permanently employed, freelancers). Sometimes such a company may use multiple vendors to optimize performance (e.g., quality, cost, time), scalability, and risk.

Referring now to FIG. 1, a method 100 for translation management is illustrated. An application lifecycle may include a development stage and a production stage. Currently, to capture bug fixes and feedback during the development stage, a translation may be performed for finalized source texts at a latest possible moment (e.g., right before going into the production stage). However, in such a method, the translation may cause many last-minute issues. For example, catching and fixing bugs caused by the translation at this stage is more expensive than at an earlier stage. Further, such a method may cause a spiky daily translation demand (e.g. a thousand words on a particular day and zero words on other days). As a consequence, vendors may need to hire multiple translators to work on a particular project, with some of the translators not being familiar with the project. As such, extra review cycles may be included in the translation process to ensure quality, which leads to more translation cost and time. To address this challenge, by continuously collecting source texts for translation before the source texts are finalized, the method 100 enables a more flattened translation demand (e.g., having daily word counts with less fluctuation), which may lead to more consistent translator assignment.

Figure 2:
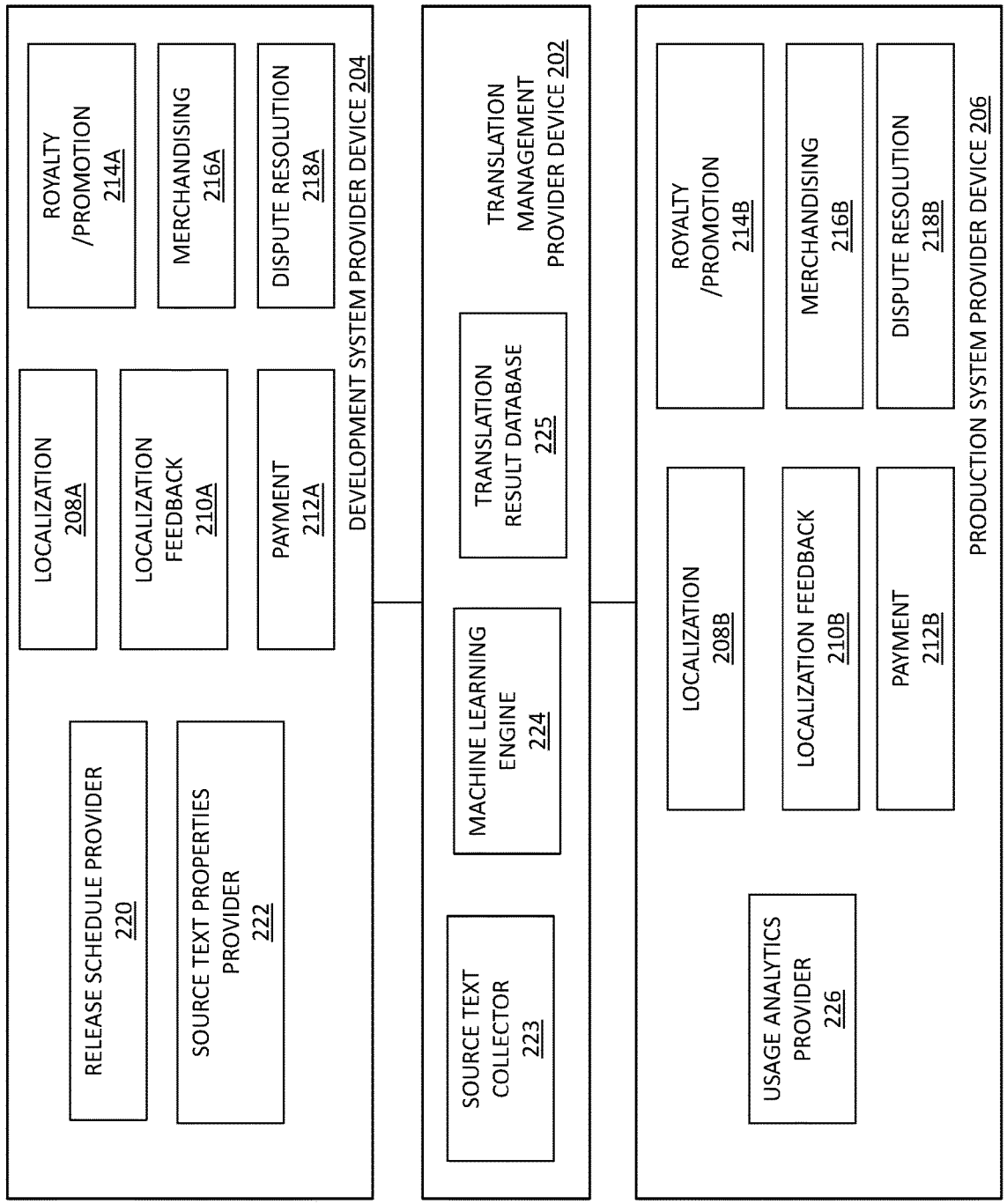
FIG. 2 is a schematic view illustrating an embodiment of a translation management provider device communicating with development and production system provider devices.

The method 100 may begin at block 102, where a translation management system collects, from a plurality of applications in a development system provider device, source texts for translation. Referring to FIG. 2, illustrated is a translation management provider device 202 communicating with a development system provider device 204 and a production system provider device 206. The development system provider device 204 provides a development environment for a plurality of applications including, for example, a localization application 208A, a localization feedback application 210A, a payment application 212A, a royalty/promotion application 214A, a merchandising application 216A, and a dispute resolution application 218A. A release schedule provider 220 may include release schedules for each of these applications. Different applications may have the same or different release schedules.

At block 102, a source text collector 223 of the translation management provider device 202 collects source texts for translation from the plurality of applications 208A through 218A of the development system provider device 204. Such collection may be performed continuously and prior to the finalization of the source texts. In other words, the source texts may be changed (e.g., added, deleted, modified) during the development stage of one or more applications, and the source text collector 223 may update the collected source texts with these changes.

The method 100 may then proceed to block 104, where a machine learning engine handles the source texts for translation. In the example of FIG. 2, a machine learning engine 224 of the translation management provider device 202 may receive the collected source texts for translation and handle those received source texts for translation, which will be discussed in detail below. At block 104, the machine learning engine 224 may receive translated texts, and update the translation result database 225 using the translated texts.

The method 100 may then proceed to block 106, where in response to a production request indicating that source texts for a particular application have been finalized and that particular application is to be deployed to production, the translation management system provides translated texts for localizing that particular application by a production system provider device. In various embodiments, after the development stage is completed, an application may proceed to a production stage, where that application is deployed to a production environment provided by the production system provider device 206, making it available to all users of the production system. In the example of FIG. 2, the production system provider device 206 includes a localization application 208B, a localization feedback application 210B, a payment application 212B, a royalty/promotion application 214B, a merchandising application 216B, and a dispute resolution application 218B corresponding to the applications in the development system provider device 204.

At block 106, the translation management provider device 202 may receive a production request indicating that source texts for a particular application (e.g., a payment application 212A) in the development system provider device 204 have been finalized and that particular application is to be deployed to production. In response to such a production request, the translation management provider device 202 may provide translated texts for the finalized source texts of the particular application for localizing that particular application in production.

The method 100 may then proceed to block 108, where the particular application is in production and is available to all users. At block 108, the translated text of the localized application in production may be displayed on a display interface of a user device associated with a user of the application.

Figure 3:
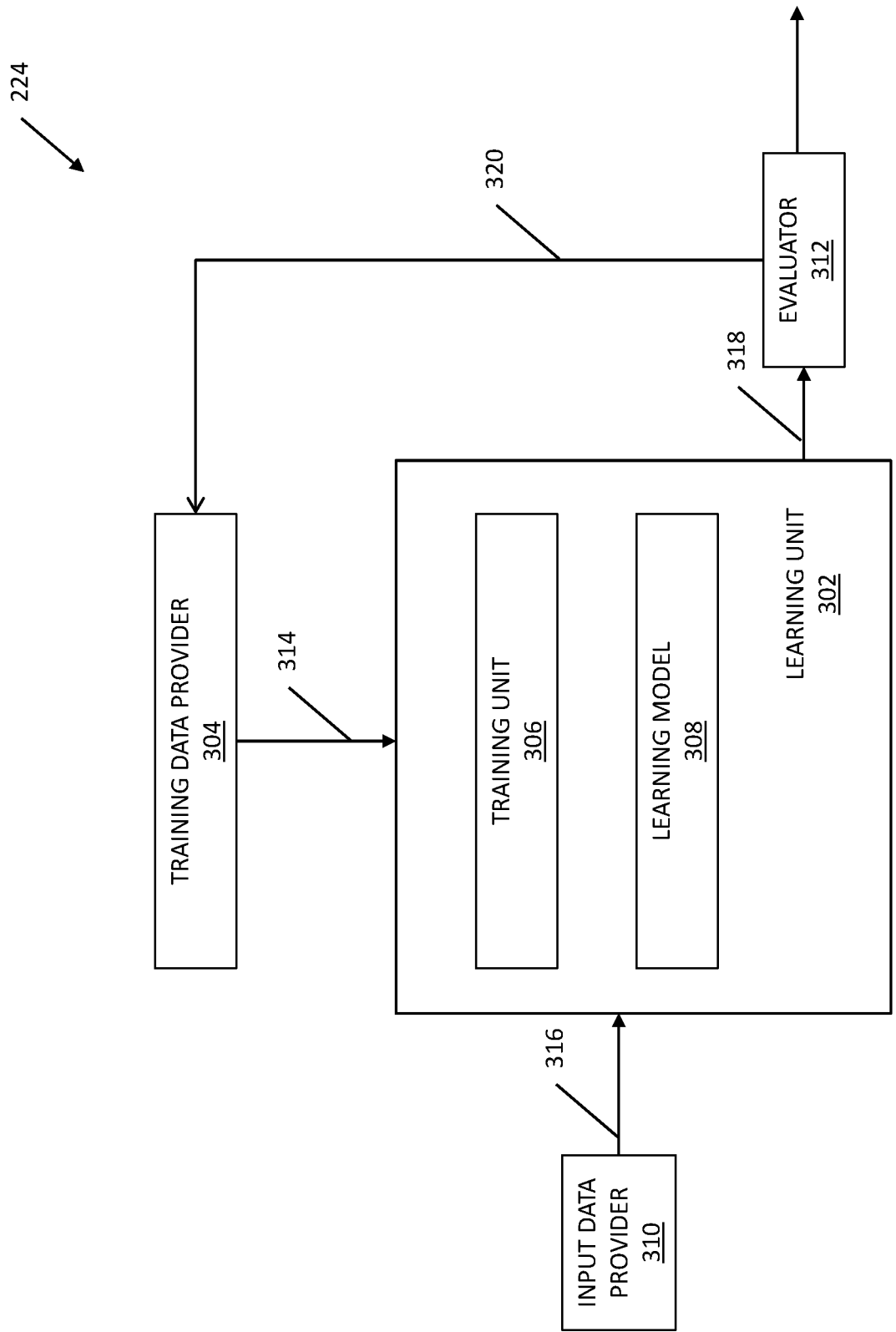
FIG. 3 is a schematic view illustrating an embodiment of a machine learning engine.
Figure 4:
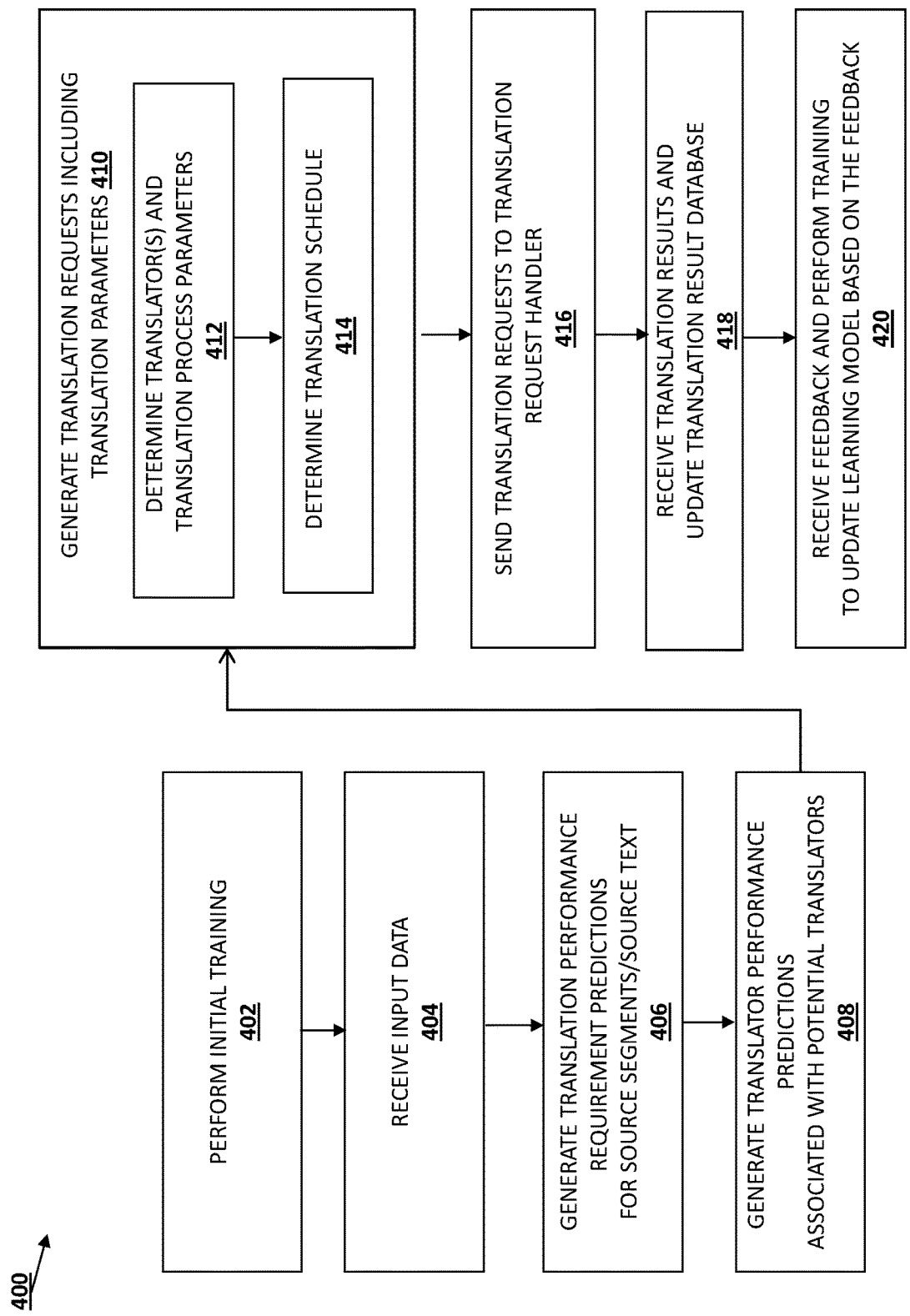
FIG. 4 is a flow chart illustrating an embodiment of a method for a machine learning engine to perform translation management.
Figure 5:
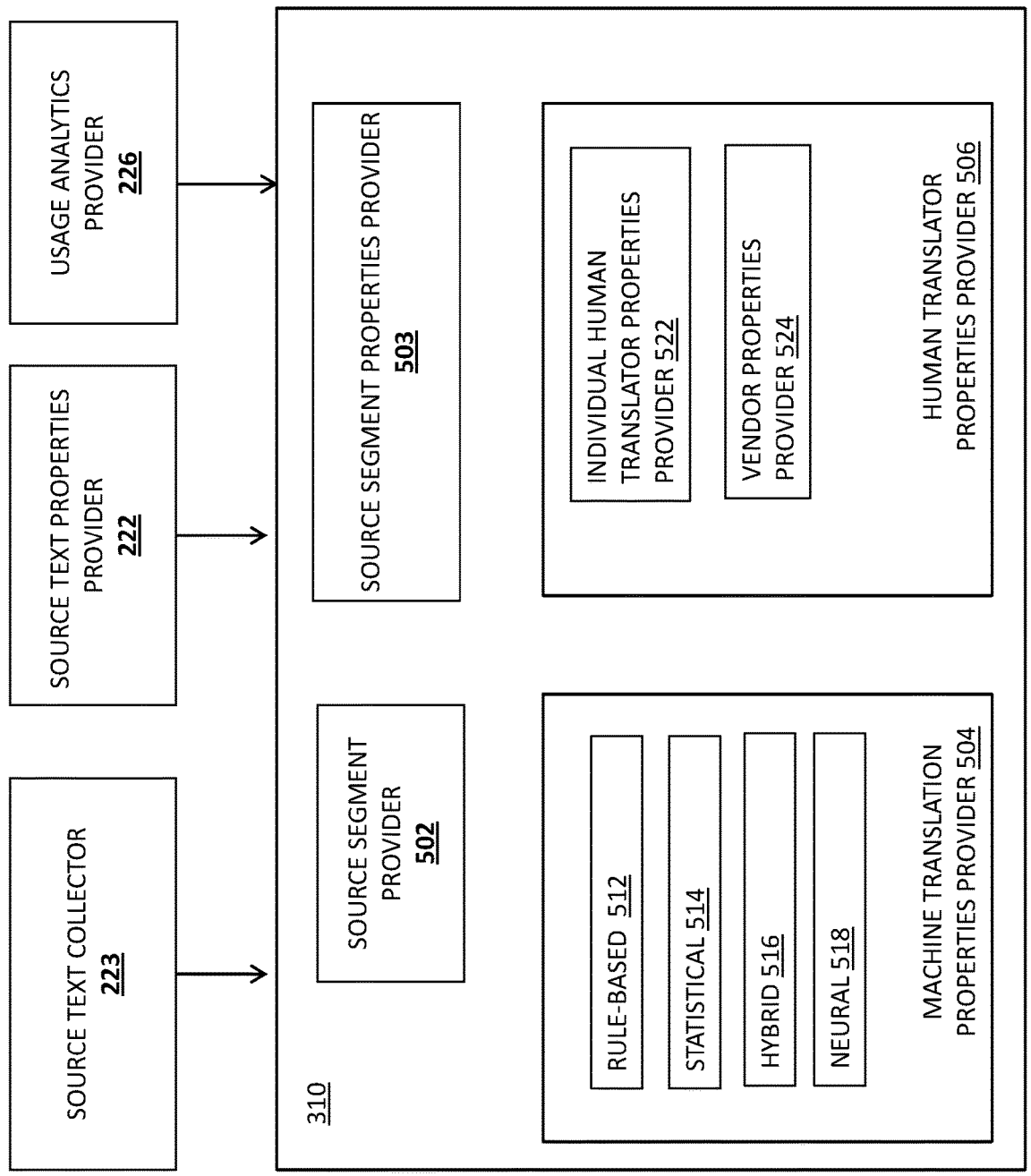
FIG. 5 is a schematic view illustrating an input data provider for a machine learning engine.
Figure 6:
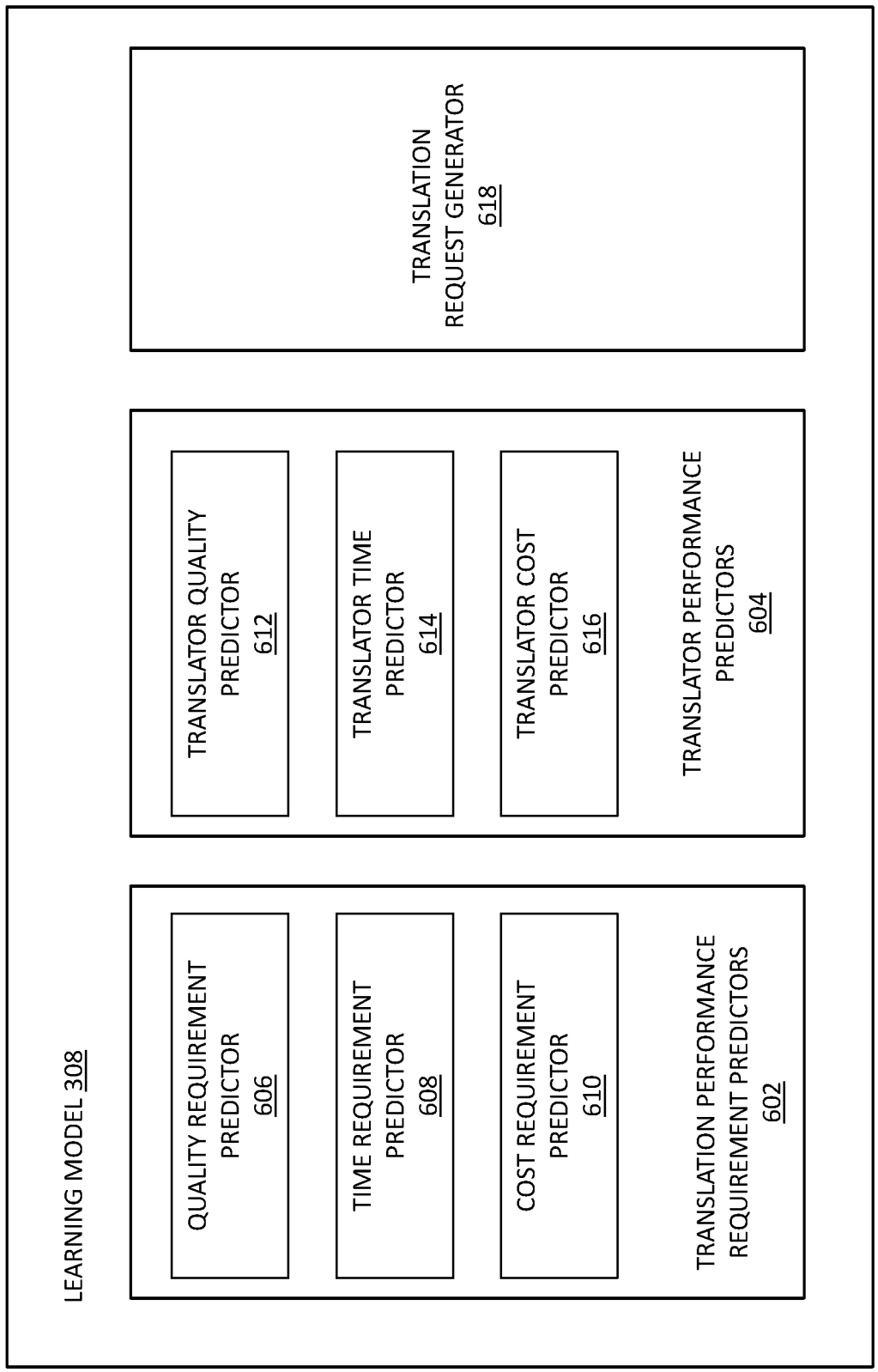
FIG. 6 is a schematic view illustrating a learning model for a machine learning engine.
Figure 7:
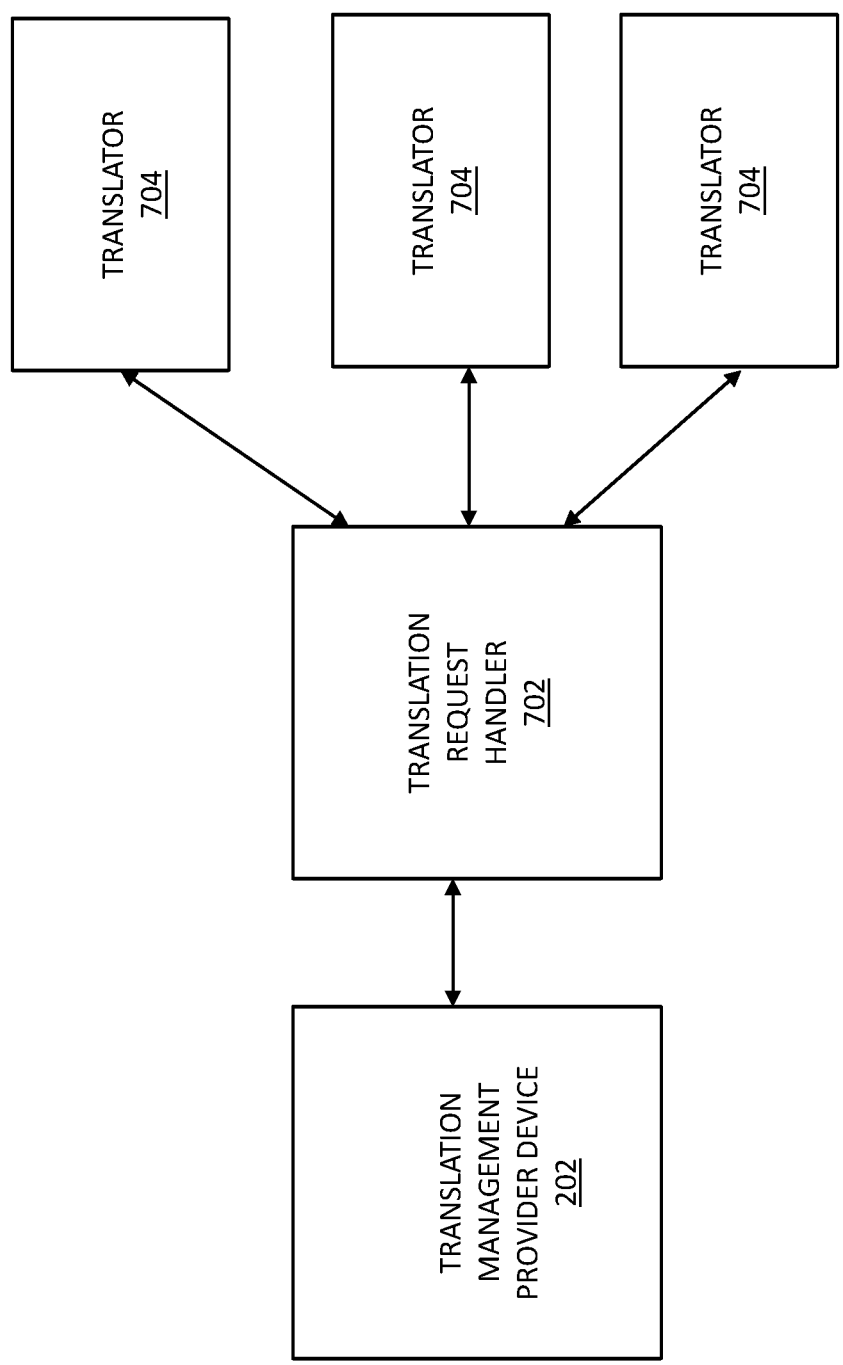
FIG. 7 is a schematic view illustrating an embodiment of a translation management provider device communicating with translators using a translation request handler.

Referring to FIGS. 3, 4, 5, 6, and 7, in various embodiments, the translation management system uses a machine learning engine that learns from data associated with the source texts, and predicts translation performance requirements (e.g., quality, cost, and/or time) associated with the source texts and associated source segments. The machine learning system may also learn from data associated with potential translators (e.g., including machine translation providers and human translators) and predict translator performance (quality, cost, and/or time) associated with particular translators. The translation management system may perform translation of the source texts including the corresponding source segments according to translation parameters (e.g., allocated translator, translation schedule, translation process parameters) provided by the machine learning engine, thereby achieving optimized translation management. FIG. 3 illustrates an example machine learning engine. FIG. 4 illustrates a method for a machine learning engine to perform translation management. FIGS. 5 and 6 illustrate various input data and learning model for a machine learning engine respectively. FIG. 7 illustrates a translation request handler for handling translation requests generated by the machine learning engine.

For example, the translation management system, using a machine learning engine, may in some cases predict that a particular translation process will generate a translation having a particular quality of translation. In this example, this quality prediction may in some cases be used to determine whether quality of the translation produced by the particular translation process is appropriate for the intended use, or whether a different translation process should be used (e.g., more resource intensive process to produce higher quality, less resource intensive process if lower quality is acceptable and resources are scarce).

In another example, the translation management system, using a machine learning engine, may predict that a particular usage of a translation will require a particular level of quality. In this example, the quality prediction may be used to determine an appropriate translation process candidate (e.g., already generated translation, machine-generated translation, human-verified translation with a particular number of review cycles) that satisfies the particular level of quality while optimizing on cost and/or time.

Referring to FIG. 3, illustrated therein is a machine learning engine 224 including a learning unit 302. During training, the learning unit 302 may receive a training data set 314 (e.g., labeled or unlabeled training data set) from the training data provider 304, and use a training unit 306 to fit a learning model 308 on the training data set 314 using one or more learning algorithms. Various types of learning algorithms (e.g., supervised learning, reinforcement learning, and any other suitable type of learning algorithm) may be used. Specifically, the learning algorithms may include, for example, Support Vector Machines (SVM), linear regression, logistic regression, naive Bayes, linear discriminant analysis, decision trees, k-nearest neighbor algorithm, Neural Networks, gradient boosting algorithms, Markov decision process, any other suitable learning algorithm, and/or a combination thereof. Such a model fitting during training may include variable selection and parameter estimation for the learning model 308.

In the example of FIG. 3, during operation, the learning unit 302 receives input data 316 from the input data provider 310. The input data 316 may include data for a plurality of variables including, for example, source text properties, source segment properties, and translator properties. The learning model 308 may make predictions/decisions 318 using the input data 316.

In the example of FIG. 3, the machine learning engine 224 includes a feedback loop including an evaluator 312. The evaluator 312 may provide feedback 320 on the predictions/decisions 318. Such feedback 320 may be provided by an operator (e.g., a human translator) using a localization feedback application 210A in the development system provider device 204, by a user using a localization feedback application 210B in the production system provider device 206, and/or by a human translator during a number of review cycles in the translation process.

In some embodiments, by using the feedback, the training data provider 304 may update its training data set, and the learning unit 302 may perform a learning process using the updated training data set to update the learning model 308 (e.g., by updating parameters and selecting variables associated with the learning model 308). As such, the machine learning engine may continue updating the learning model 308 by learning from real-time data, which may then be used to provide more accurate predictions and more optimal translation requests.

Referring to FIG. 4, illustrated is a method 400 (e.g., block 104 of FIG. 1) for a machine learning engine (e.g., a machine learning engine 224 of FIG. 3) to perform translation management. The method 400 begins at block 402, where an initial training is performed using training unit 306 to generate a learning model 308. For example, a machine learning engine 224 may perform an initial training using an initial training dataset from the training data provider 304 based on one or more learning algorithms. Specifically, the learning algorithms may include, for example, Support Vector Machines (SVM), linear regression, logistic regression, naive Bayes, linear discriminant analysis, decision trees, k-nearest neighbor algorithm, Neural Networks, gradient boosting algorithms, Markov decision process, any other suitable learning algorithm, and/or a combination thereof. Such a model fitting during training may include variable selection and parameter estimation for the learning model 308.

The method 400 may then proceed to block 404, where the machine learning engine receives input data associated with the variables of the learning model 308. In the example of FIG. 3, a learning unit 302 of the machine learning engine 224 receives input data 316 from an input data provider 310. Referring to the example of FIG. 5, the input data provider 310 may provide input data including source texts to be translated (e.g., from a source text collector 223 of a translation management device 202), and variable data associated with variables of the learning model 308 including for example source texts properties, source segments properties, translator properties, and any other suitable variable for the learning model 308.

In some embodiments, the input data provider 310 may receive source text properties from a source text properties provider 222 (e.g., source text properties provider 222 of a development system provider device 204 of FIG. 2). Various techniques may be used by the source text properties provider 222. In an example, the source text properties provider 222 uses a hidden text (e.g., an invisible code not displayed on a page to a user) associated with a source text to provide page information associated with the source text. The source text properties may include such page information, and/or use such page importation to determine additional source text properties for the source text on that particular page.

In some embodiments, input data provider 310 may provide source texts that include various web page headings and error messages for translation (each having different quality or cost requirements). In such embodiments, the source text properties may include variable data including page properties of the web page. The page properties may include page type (e.g., "HOME PAGE," "ERROR PAGE," "HELP PAGE"), page identifiers, page importance levels (e.g., "LOW," "MEDIUM," "HIGH"), and any other suitable page properties.

In some embodiments, the source text properties associated with a particular source text may include an importance level (e.g., "LOW," "MEDIUM," "HIGH") indicating the importance of that particular source text. For example, a source text includes a hero message (e.g., "Everywhere you go.") on a homepage of an application (e.g., a payment application 212A). In that example, source text properties for that source text may include an importance level of "HIGH." For further example, source text properties for a source text including an error message (e.g., "Page not found.") may include an importance level of "LOW."

In some embodiments, the source text properties associated with a particular source text may include a legal/compliance requirement level (e.g., "LOW," "MEDIUM," "HIGH") associated with legal/compliance requirements associated with that particular source text.

In some embodiments, the input data provider 310 may receive source text properties including usage information associated with a source text from a usage analytics provider 226 (e.g., usage analytics provider 226 of a production system provider device 206 of FIG. 2 or a third-party usage analytics provider that monitors traffic of the application(s)).

In some embodiments, the source text properties associated with a particular source text may include a target completion date associated with that particular source text.

In an example, the target completion date is a release date of an application using that particular source text (e.g., provided by a release schedule provider 220 of the development system provider device 204).

It is noted that in some embodiments, a particular source text may be used in a plurality of applications. As such, the source text properties for that particular source text may be generated based on the corresponding properties associated with the plurality of applications. In an example, a particular source text has first, second, and third importance levels ("HIGH," "MEDIUM," and "LOW") associated with first, second, and third applications, respectively. In that example, the source text properties provider 222 selects the highest importance level (e.g., "HIGH") as the importance level of the source text properties for that source text. In another example, a particular source text has first, second, and third target completion dates ("Jun. 1, 2018," "Sep. 1, 2018," and "Dec. 1, 2018") associated with first, second, and third applications, respectively. In that example, the source text properties provider 222 selects the closest target completion date (e.g., "Jun. 1, 2018") as the target completion date of the source text properties for that source text. In yet another example, a particular source text has first, second, and third usage analytics (e.g., "5 views/day," "10 views/day," and "100 views/day") associated with first, second, and third applications (e.g., payment application 212B, royalty/promotion application 214B, merchandising application 216B) of the production system provider device 206, respectively. In that example, the usage analytics provider 226 generates a combined usage (e.g., "115 views/day") as the usage information of the source text properties for that source text.

In some embodiments, different weights (e.g., 10, 0.3, and 0.2) may be assigned to different applications (e.g., payment application 212B, royalty/promotion application 214B, merchandising application 216B). In those embodiments, the source text properties may be generated using those weights. In an example, a particular source text has first, second, and third usage analytics (e.g., "5 views/day," "10 views/day," and "100 views/day") associated with respective first, second, and third applications (e.g., payment application 212B, royalty/promotion application 214B, merchandising application 216B). In that example, the usage analytics provider 226 may apply the weights to the respective usage analytics, and generate a weighted combined usage (e.g., "73 views/day") as the usage information of the source text properties for that source text.

In some embodiments, the input data provider 310 includes a source segment provider 502. The source segment provider 502 may break down a source text to the smallest source segments (e.g., word, phrase, sentence, and/or any other suitable segment) that may be meaningfully translated (e.g., by a machine translation provider and/or a human translator). Note that "meaningfully" may have different accuracy levels based on the usage of the translated source text. For example, "meaningfully" translated may require 90% accuracy for one translation usage, but only 60% accuracy for a different translation usage, where translation usage may be based on the person/machine using the translation in addition to the intended use of the translation. The input data provided by the input data provider 310 may also include source segment properties associated with the source segment (e.g., provided by a source segment properties provider 503). The source segment properties may include, for example, a word count, a terminology, a grammar complexity level, a grammar difficulty level, any other suitable properties associated with the source segment, and/or a combination thereof. In some embodiments, such source segment properties may affect the quality of a translation (e.g., performed by a machine translation or a human translator).

In some embodiments, the input data provided by the input data provider 310 may include various translator properties. In an example, the input data provider 310 receives, from a machine translation properties provider 504, machine translation properties associated with a particular machine translation provider (e.g., a rule-based machine translation provider 512, a statistical machine translation provider 514, a hybrid machine translation provider 516, or a neural machine translation provider 518). The machine translation properties may include translation quality metrics, a translation time property, and/or a translation cost property. The translation quality metrics may include, for example, bilingual evaluation understudy (BLEU) metrics, US National Institute of Standards and Technology (NIST) metrics, Word error rate (WER) metrics, any other suitable translation quality metrics, and/or a combination thereof. In some embodiments, because the translation time and cost of machine translation are significantly less than the translation time and cost of human translators, the machine learning engine may use a default value of zero for the translation time and cost of machine translation.

In some embodiments, the input data provider 310 receives, from a human translator properties provider 506, human translator properties associated with an individual human translator or a vendor having a network of individual human translators. In the example of FIG. 5, the human translator properties provider 506 includes an individual human translator properties provider 522 and a vendor properties provider 524. The human translator properties may include a subject matter familiarity level, a general experience level, a cost property (e.g., cost for each word), a time property (e.g., time needed for translating 100 words), and any other suitable human translator properties. The human translator properties associated with an individual human translator may include an employment status property (e.g., permanent employee, freelancer), and a translation capacity property (e.g., 1800 words/day). The human translator properties associated with a vendor may include a certification property (e.g., indicating whether the vendor is certified by international Quality Assurance standards), a multi-language indicator indicating whether the vendor is a single-language vendor or multi-language vendor, a total permanent employee capacity property (e.g., 5000 words/day) indicating the total capacity of all translators of the vendor who are permanent employees, a total freelancer capacity property (e.g., 6,000 words/day) indicating the total capacity of all translators of the vendor who are freelancers.

The method 400 may then proceed to block 406, where translation performance requirement predictions are generated for a source text and/or its associated source segments. Referring to FIG. 6, the learning model 308 (e.g., the learning model 308 of the machine learning engine 224) may include translation performance requirement predictors 602. The translation performance requirement predictors 602 include a quality requirement predictor 606 for generating a quality requirement prediction, a time requirement predictor 608 for generating a time requirement prediction, and a cost requirement predictor 610 for generating a cost requirement prediction. The translation performance requirement predictors 602 may generate the translation performance (e.g., quality, cost, time) requirement predictions for a particular source text or source segment based on the input variable data (e.g., source text properties including an importance level, usage information, legal/compliance requirement level, target completion date), and selected variables and parameters for the translation performance requirement predictors 602 updated by the training unit 306.

The method 400 may then proceed to block 408, where translator performance predictions are generated for a source text and/or its associated source segments for one or more potential translators. Referring to FIG. 6, the learning model 308 (e.g., the learning model 308 of the machine learning engine 224) may include translator performance predictors 604. The translator performance predictors 604 include a translator quality predictor 612 for generating a quality prediction associated with a particular translator, a translator time predictor 614 for generating a time prediction with that particular translator, and a translator cost predictor 616 for generating a cost prediction associated with that particular translator. The translator performance predictors 604 may generate the translation performance (e.g., quality, cost, time) predictions for a particular source text/source segment and a particular translator based on the input variable data (e.g., translator properties, source segment properties), and selected variables and parameters for the translator performance predictors 604 updated by the training unit 306.

The method 400 may then proceed to block 410, where translation requests including various translation parameters are generated. Referring to FIG. 6, the learning model 308 (e.g., the learning model 308 of the machine learning engine 224) may include a translation request generator 618 for generating translation requests for a particular source text/source segment. In some embodiments, the translation requests are generated based on the translation performance requirement predictions and the translator performance predictions.

In the example of FIG. 4, block 410 includes blocks 412 and 414 for determining various translation parameters of a translation request. In some embodiments, at block 412, the translation request generator 618 determines one or more translators for the translation request. In an example, for a particular source segment, the translator performance prediction of a particular machine translation provider (e.g., a rule-based machine translation provider) satisfies the translation performance requirement predictions. In that example, that particular machine translation provider is assigned to the translation request. In another example, for a particular source segment, a difference (e.g., quality difference) between the translator performance prediction of a particular machine translation provider and the translation performance requirement prediction is less than a predetermined threshold. In that example, the translation request generator 618 may assign the particular machine translation provider for an initial translation, and assign one or more human translators to perform a number of review cycles based on that quality difference. In yet another example, for a particular source segment, each of the differences (e.g., quality difference) between the translator performance predictions of all machine translation providers and the translation performance requirement prediction is greater than a predetermined threshold, which indicates that that particular source segment is not suitable for machine translation. In that example, the translation request generator 618 may assign a human translator (e.g., an individual human translator or a vendor) as the translator based on a translator performance prediction associated with that human translator.

In some embodiments, at block 414, the translation request generator 618 determines a translation schedule for the translation request. A translation request to be translated by a machine translation provider may be usually performed as soon the request is received, as machine translation usually has a practically unlimited capacity. On the other hand, human translators have limited capacities. As such, to obtain a more flattened demand for human translators as discussed above, for translation requests with human translators, the translation request generator 618 may determine a translation schedule based on the target completion date, the previously postponed translation requests, and translator properties including, for example, an individual human translator translation capacity property, a vendor total permanent employee capacity property, and/or a vendor total freelancer capacity property. In an example, the translation request generator 618 determines that a particular translation request exceeds the capacity (e.g., a daily word count limit) of the assigned human translator of a particular day, and in response, provides a translation schedule that postpones that particular translation request.

The method 400 may then proceed to block 416, where the translation requests are sent to a translation request handler. Referring to FIG. 7, the translation management provider device 202 sends the translation requests to a translation request handler 702. The translation request handler 702 may then send the translation requests to corresponding translators 704 based on the translation parameters (e.g., translator, translation process, translation schedule) of the translation request. In some embodiments, a translation request may be sent to a translator 704 that is a machine translation provider, an individual human translator, or a vendor. In some embodiments, a translation request is sent by the translation request handler 702 to the corresponding translator 704 without any delay (e.g., on a same day), or is postponed to be sent at a later date based on a translation schedule of that translation request. In some embodiments, the translation request handler 702 requests the corresponding translator 704 to perform a number of review cycles according to the translation process parameter of a particular translation request.

The method 400 may then proceed to block 418, where translation results are received, and the translation result database is updated using the translation results. As shown in the example of FIG. 7, the translation request handler 702 may receive translation results from the translators 704 in response to the translation requests. The translation management provider device 202 may receive those translation results from the translation request handler 702, and update the translation result database 225 using the received translation results.

The method 400 may then proceed to block 420, where feedback associated with the translation is received, and training is performed to update the learning model based on the feedback. Referring to FIGS. 2, 3, and 7, the machine learning engine 224 includes a feedback loop including the evaluator 312. The evaluator 312 may provide the feedback 320 based on feedback provided by an operator (e.g., a human translator) using a localization feedback application 210A in the development system provider device 204, by a user using a localization feedback application 210B in the production system provider device 206, and/or from a translation request handler provided by a human translator during a number of review cycles in the translation process. The training data provider 304 may update its training data set using the feedback, and the learning unit 302 may perform a learning process using the updated training data set to update the learning model 308 (e.g., by updating parameters and selecting variables associated with the learning model 308). As such, the machine learning engine may continue updating the learning model 308 by learning from real-time data, which may then be used to provide more accurate predictions and more optimal translation requests.

It is also noted that in some embodiments, an eventual quality level model is implemented in the machine learning quality engine (e.g., using the translation performance requirement predictors 602). In such embodiments, the required quality (with the associated predictions) for a particular source text at a time prior to its target completion date may be lower than an eventual quality level. The required quality for that particular source text may increase over time, and reach the eventual quality level at that target completion date.

Thus, systems and methods have been described that allow a translation management system to generate a more flattened (e.g., a lower number of fluctuations and/or less variation of the fluctuations) translation demand over a certain period (e.g., six months, one year, two years, five years). In some embodiments, instead of waiting until the source texts are finalized or near finalization to perform translation, the translation management system continuously collects source text for translation during a period that the source text is generated and updated. In those embodiments, the source text is collected incrementally over that period, and the translation demand provided based on such continuously collected source text is more flattened and has less fluctuation. Such a more flattened translation demand allows a continuous translation process with consistent human translator allocations, which may improve translation quality and reduce translation cost and time. In some embodiments, the translation management system uses a machine learning engine that learns from data associated with the source texts, and predicts translation quality, cost, and/or time associated with the source text and its source segments. The machine learning system may also learn from data associated with the potential translators (e.g., including machine translation providers and human translators) and predict translation quality, cost, and/or time associated with particular translators. The translation management system may perform translation of the source texts including the corresponding source segments according to translation parameters (e.g., allocated translator, translation schedule, translation process parameters) provided by the machine learning engine, thereby achieving translation management with optimized quality, scalability, and reduced risk.

Figure 8:
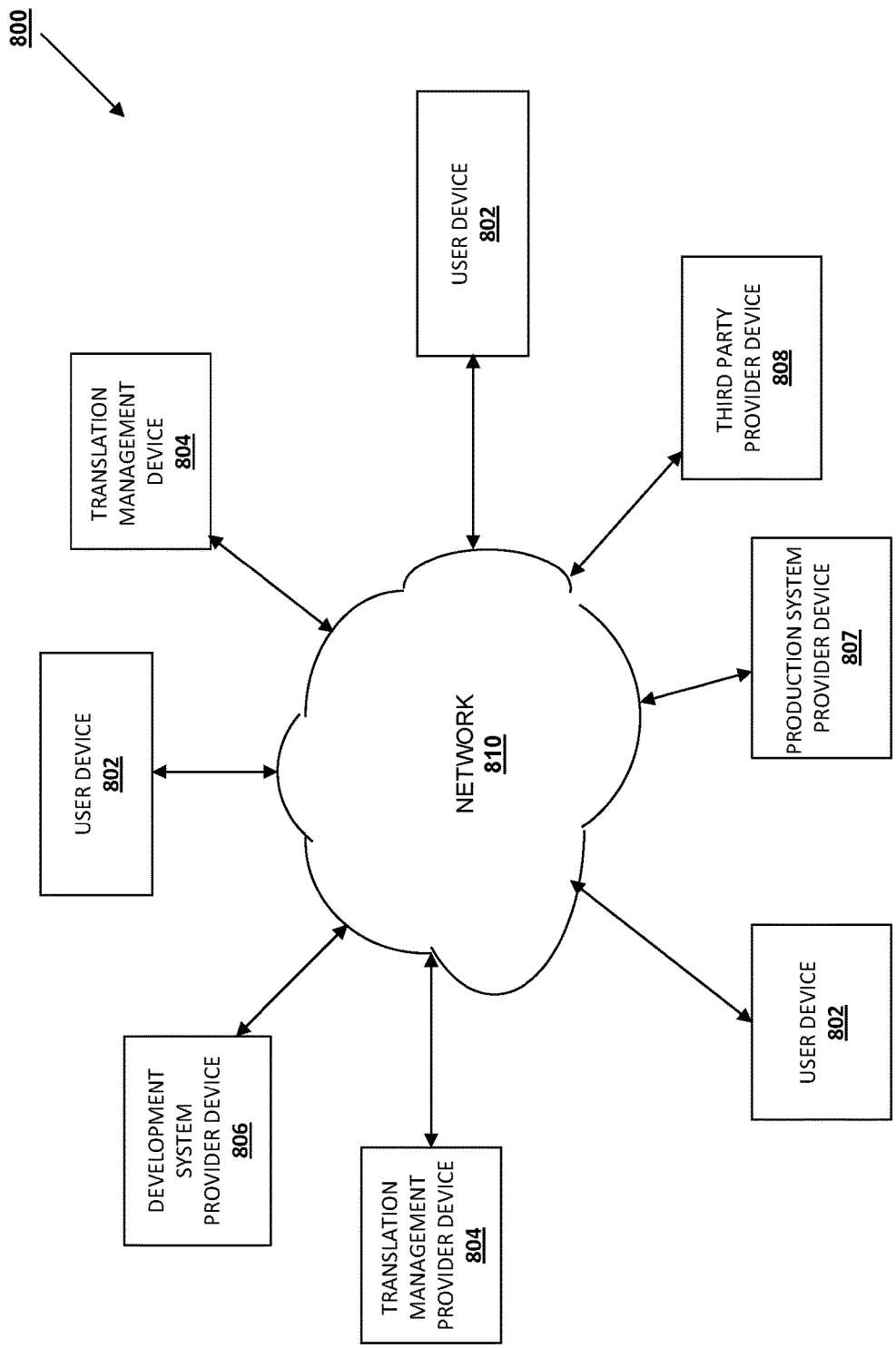
FIG. 8 is a schematic view illustrating an embodiment of a networked system.

Referring now to FIG. 8, an embodiment of a network-based system 800 for implementing one or more processes described herein is illustrated. As shown, network-based system 800 may comprise or implement a plurality of servers and/or software components that operate to perform various methodologies in accordance with the described embodiments. Example servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 8 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 800 illustrated in FIG. 8 includes one or more user devices 802, one or more translation management provider devices 804, one or more development system provider devices 806, one or more production system provider device 807, and one or more third party service provider devices 808 in communication over a network 810. Any of the user devices 802 may be the user device discussed above and used by the user discussed above. The translation management provider device 804 may be the translation management provider device 202 discussed above and may be operated by a system provider such as, for example, PayPal Inc. of San Jose, Calif. The development system provider device 806 may be the development system provider device 204 discussed above. The third party service provider device 808 may be the service provider device discussed above and may be operated by various service providers including application usage analytics service providers, payment service providers, gaming service providers, travel service providers, and/or any other service providers.

The user devices 802, translation management provider devices 804, development system provider devices 806, production system provider device 807, and third party service provider devices 808 may each include one or more processors, memories, and other appropriate components for executing instructions such as program code and/or data stored on one or more computer-readable mediums to implement the various applications, data, and steps described herein. For example, such instructions may be stored in one or more computer-readable mediums such as memories or data storage devices internal and/or external to various components of the system 800, and/or accessible over the network 810.

The network 810 may be implemented as a single network or a combination of multiple networks. For example, in various embodiments, the network 810 may include the Internet and/or one or more intranets, landline networks, wireless networks, and/or other appropriate types of networks.

The user device 802 may be implemented using any appropriate combination of hardware and/or software configured for wired and/or wireless communication over network 810. For example, in one embodiment, the user device 802 may be implemented as a personal computer of a user in communication with the Internet. In some embodiments, the user device 802 may be a wearable device. In some embodiments, the user device 802 may be a smart phone, personal digital assistant (PDA), laptop computer, and/or other types of computing devices.

The user device 802 may include one or more browser applications which may be used, for example, to provide a convenient interface to permit the user to browse information available over the network 810. For example, in one embodiment, the browser application may be implemented as a web browser configured to view information available over the Internet.

The user device 802 may also include one or more toolbar applications which may be used, for example, to provide user-side processing for performing desired tasks in response to operations selected by the customer. In one embodiment, the toolbar application may display a user interface in connection with the browser application.

The user device 802 may further include other applications as may be desired in particular embodiments to provide desired features to the user device 802. In particular, the other applications may include a personal financial management application and/or a personal health management application provided by a third party provider through a third party service provider device 808. The other applications may also include security applications for implementing user-side security features, programmatic user applications for interfacing with appropriate application programming interfaces (APIs) over the network 810, or other types of applications. Email and/or text applications may also be included, which allow the user to send and receive emails and/or text messages through the network 810. The user device 802 includes one or more user and/or device identifiers which may be implemented, for example, as operating system registry entries, cookies associated with the browser application, identifiers associated with hardware of the user device 802, or other appropriate identifiers, such as a phone number.

Note that translation management provider device 804 may be a part of another device, such as development system provider device 806, in various embodiments. Functionality of various ones of the devices shown in FIG. 8 and/or referred to herein may be combined into a single or different devices as consistent with the techniques discussed. Thus, functionality or structures described individually relative to the translation management provider device 804, development system provider device 806, or third party service provider device 808 may be combined into one or more systems in various embodiments.

Figure 9:
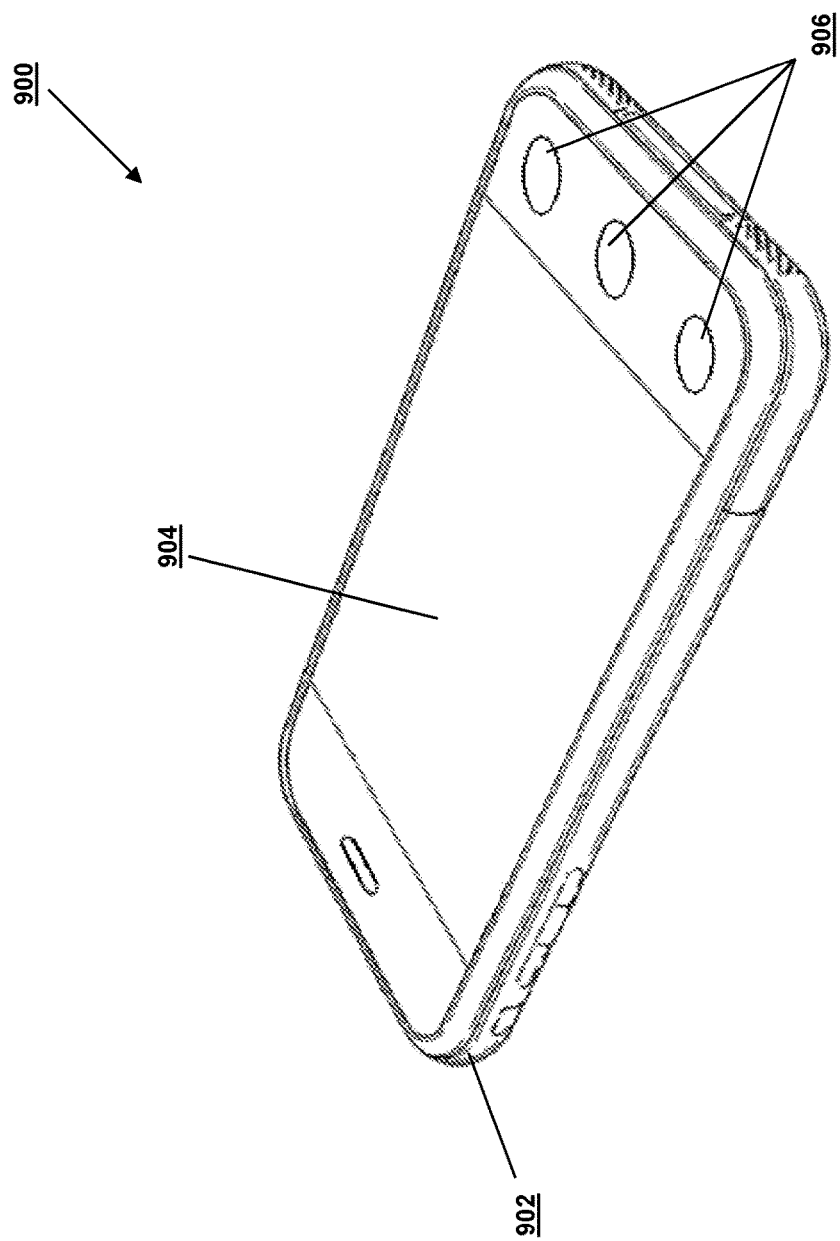
FIG. 9 is a perspective view illustrating an embodiment of a user device.

Referring now to FIG. 9, an embodiment of a user device 900 is illustrated. The user device 900 may be the user device for display an application in production. The user device 900 includes a chassis 902 having a display 904 and an input device including the display 904 and a plurality of input buttons 906. One of skill in the art will recognize that the user device 900 is a portable or mobile phone including a touch screen input device and a plurality of input buttons that allow the functionality discussed above with reference to the method 100. However, a variety of other portable/mobile user devices may be used in the method 100 without departing from the scope of the present disclosure.

Figure 10:
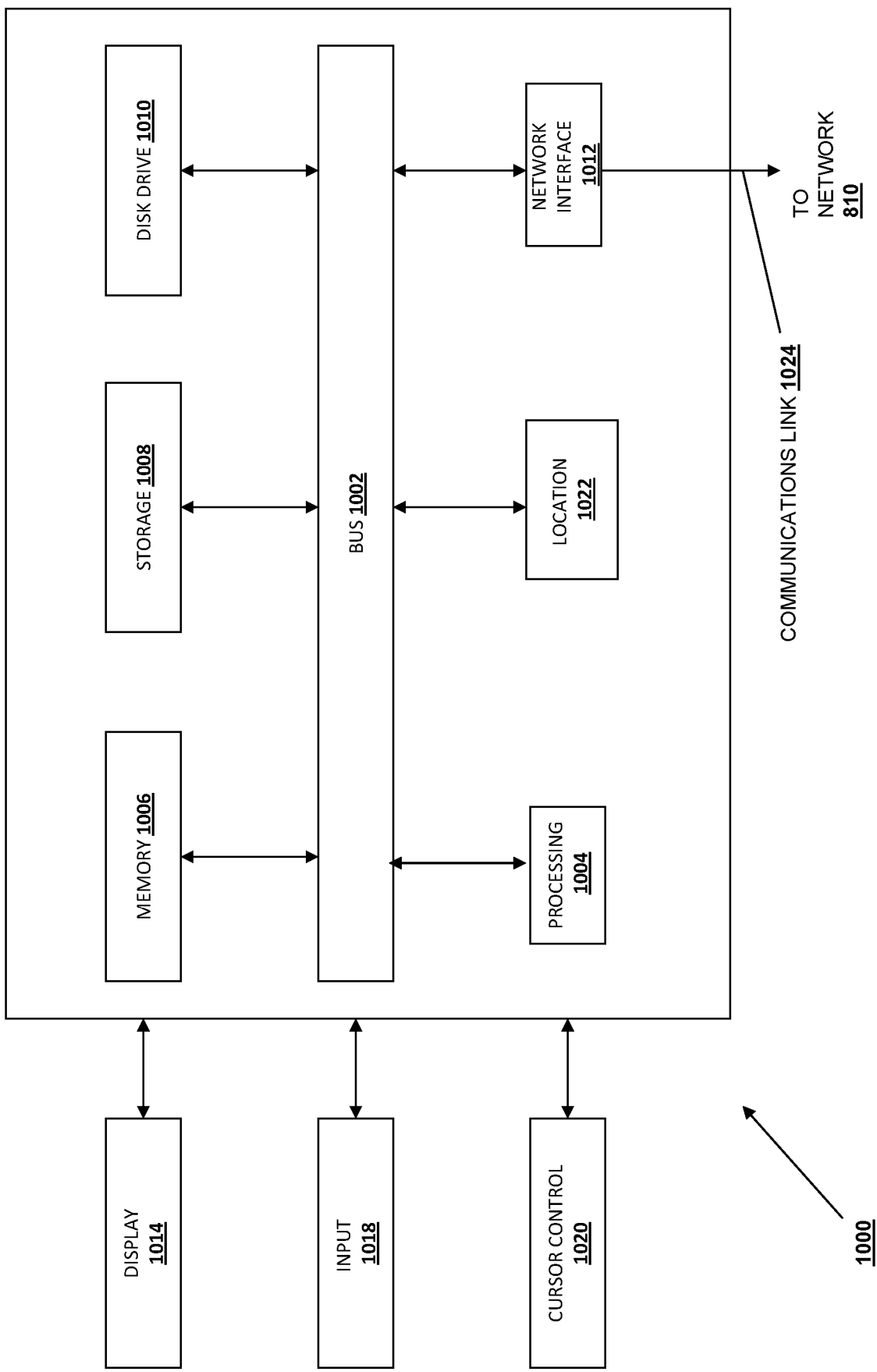
FIG. 10 is a schematic view illustrating an embodiment of a computer system.

Referring now to FIG. 10, an embodiment of a computer system 1000 suitable for implementing, for example, the computer systems of the translation management provider device 202 and 804, development system provider devices 204 and 806, production system provider devices 206 and 807, and third party service provider devices 808, is illustrated. It should be appreciated that other devices utilized by users, payment service providers, other third party service providers, and/or system providers in the system discussed above may be implemented as the computer system 1000 in a manner as follows. In accordance with various embodiments of the present disclosure, computer system 1000, such as a computer and/or a network server, includes a bus 1002 or other communication mechanism for communicating information, which interconnects subsystems and components, such as a processing component 1004 (e.g., processor, micro-controller, digital signal processor (DSP), etc.), a system memory component 1006 (e.g., RAM), a static storage component 1008 (e.g., ROM), a disk drive component 1010 (e.g., magnetic or optical), a network interface component 1012 (e.g., modem or Ethernet card), a display component 1014 (e.g., CRT or LCD), an input component 1018 (e.g., keyboard, keypad, or virtual keyboard), a cursor control component 1020 (e.g., mouse, pointer, or trackball), and a location sensor component 1022 (e.g., a Global Positioning System (GPS) device as illustrated, a cell tower triangulation device, and/or a variety of other location determination devices known in the art). In one implementation, the disk drive component 1010 may comprise a database having one or more disk drive components.

In accordance with embodiments of the present disclosure, the computer system 1000 performs specific operations by the processor 1004 executing one or more sequences of instructions contained in the memory component 1006, such as described herein with respect to translation management provider device 202 and 804, development system provider devices 204 and 806, production system provider devices 206 and 807, and third party service provider devices 808. Such instructions may be read into the system memory component 1006 from another computer-readable medium, such as the static storage component 1008 or the disk drive component 1010. In other embodiments, hard-wired circuitry may be used in place of or in combination with software instructions to implement the present disclosure.

Logic may be encoded in a computer-readable medium, which may refer to any medium that participates in providing instructions to the processor 1004 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1010, volatile media includes dynamic memory, such as the system memory component 1006, and transmission media includes coaxial cables, copper wire, and fiber optics, including wires that comprise the bus 1002. In one example, transmission media may take the form of acoustic or light waves, such as those generated during radio wave and infrared data communications.

Some common forms of computer readable medium includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable medium is non-transitory.

In various embodiments of the present disclosure, execution of instruction sequences to practice the present disclosure may be performed by the computer system 1000. In various other embodiments of the present disclosure, a plurality of the computer systems 1000 coupled by a communication link 1024 to the network 810 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1000 may transmit and receive messages, data, information and instructions, including one or more programs (i.e., application code) through the communication link 1024 and the network interface component 1012. The network interface component 1012 may include an antenna, either separate or integrated, to enable transmission and reception via the communication link 1024. Received program code may be executed by processor 1004 as received and/or stored in disk drive component 1010 or some other non-volatile storage component for execution.

Figure 11:
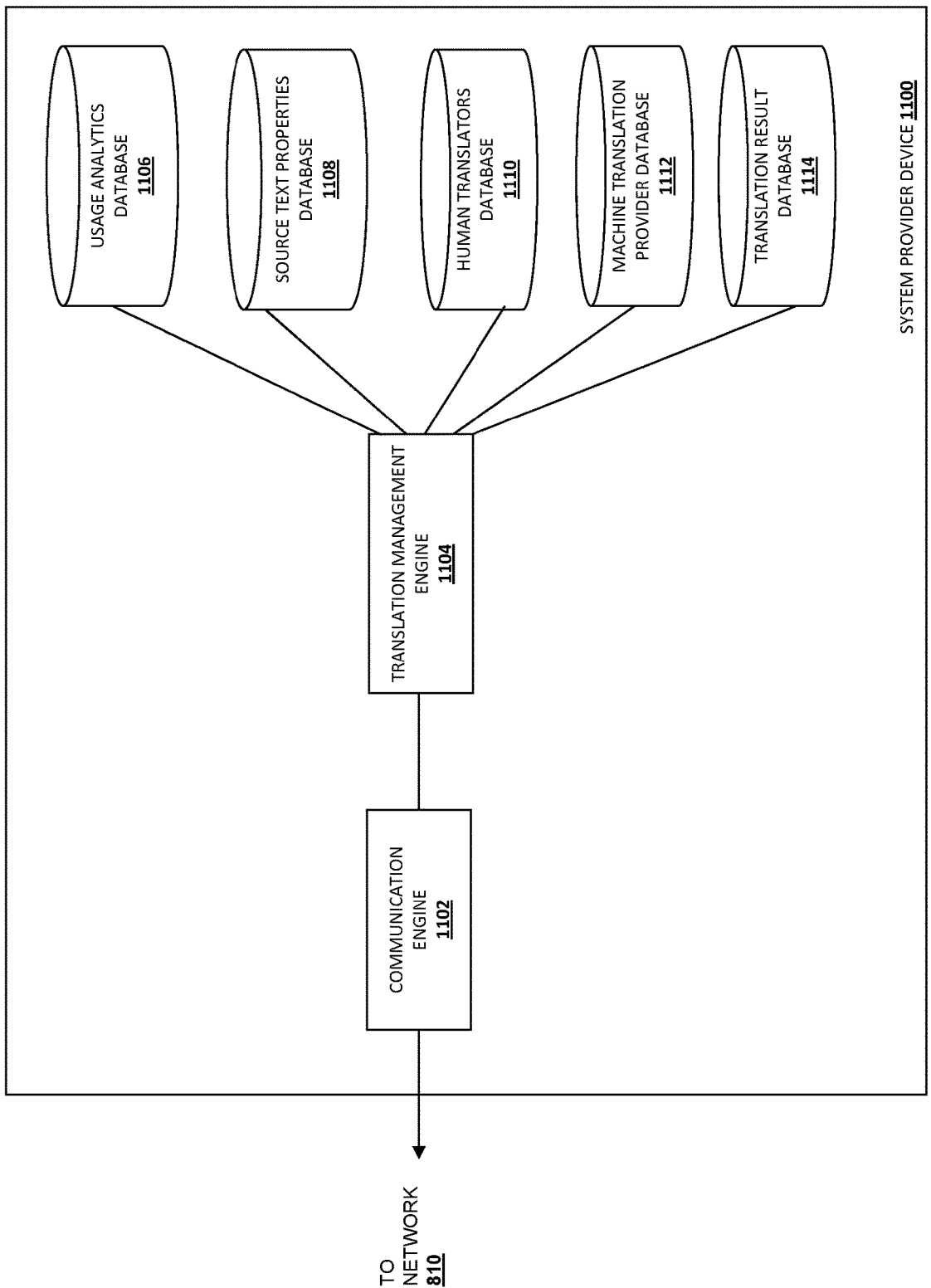
FIG. 11 is a schematic view illustrating an embodiment of a system provider device.

Referring now to FIG. 11, an embodiment of a translation management provider device 1100 is illustrated. In an embodiment, the translation management provider device 1100 may be the system provider devices discussed above. The translation management provider device 1100 includes a communication engine 1102 that is coupled to the network 810 and to a translation management engine 1104 that is coupled to a usage analytics database 1106, a source text properties database 1108, a human translator database 1110, a machine translation provider database 1112, and a translation result database 1114. The communication engine 1102 may be software or instructions stored on a computer-readable medium that allows the translation management provider device 1100 to send and receive information over the network 810. The translation management engine 1104 may be software or instructions stored on a computer-readable medium that is operable to in response to a first user request to initiate a first session with a service provider account of a user, establishing the first session with the service provider account and displaying service provider account information on the display interface; in response to a second user request to access third party account information associated with a third party account of the user, determining that a second session between a user device and the third party account of the user is active; causing a first validation to access the third party account information associated with the second session; updating the display interface to concurrently display the third party account information and the service provider account information; in response to receiving a transaction request for a transaction associated with the service provider account of the user and the third party account of the user, sending information to cause a second validation of the transaction request by a provider of the third party account; in response to the second validation of the transaction request by the provider of the third party account, processing the requested transaction, and provide any of the other functionality that is discussed above. While the databases 1106-1114 have been illustrated as separate from each other and located in the translation management provider device 1100, one of skill in the art will recognize that any or all of the databases 1106-1114 may be combined and/or may be connected to the translation management engine 1104 through the network 810 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer-readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system for performing source text collection and translation, comprising:
a non-transitory memory storing instructions; and
one or more hardware processors coupled to the non-transitory memory and configured to read the instructions from the non-transitory memory to cause the system to perform operations comprising:
collecting periodically, from one or more applications, one or more source texts for translation, wherein the one or more source texts are under development and are updates from one or more previously translated source texts;
providing, to a machine learning engine, source text properties associated with the one or more source texts;
generating, by the machine learning engine, a plurality of translation performance requirement predictions associated with a plurality of source segments of the one or more source texts respectively based on the source text properties;
based on the plurality of translation performance requirement predictions, generating, by the machine learning engine, a plurality of translation requests associated with the plurality of source segments for translation of the one or more source texts;
determining that the plurality of translation requests associated with the plurality of source segments exceeds a total daily word count limit determined by the machine learning engine based on a translation capacity learned by the machine learning engine to flatten a translation demand associated with a development time period of the one or more source texts under development;
in response to the determining that the plurality of translation requests associated with the plurality of source segments exceeds the total daily word count limit, providing on a future day, by the machine learning engine, the plurality of translation requests associated with the plurality of source segments;
receiving one or more translated texts generated in response to executing the plurality of translation requests; and
updating a translation result storage using the one or more translated texts.

2. The system of claim 1, wherein the one or more applications are provided by a development system provider device; and
wherein the operations further comprise:
repeating the collecting periodically, from the one or more applications, the one or more source texts for translation, at a first frequency;
receiving a first production request associated with a first application of the one or more applications; and
in response to receiving the first production request, providing first translated texts associated with the first application for localizing the first application by a production system provider device.

3. The system of claim 1, wherein a first source text property of the source text properties associated with a first source text includes an importance level of a page containing the first source text.

4. The system of claim 1, wherein a first source text property of the source text properties associated with a first source text includes user usage information of a page containing the first source text.

5. The system of claim 1, wherein the generating the plurality of translation performance requirement predictions is further based on source segment properties associated with the plurality of source segments.

6. The system of claim 5, wherein a first source segment property associated with a first source segment includes a property selected from the group consisting of a word count, a terminology, a grammar complexity level, and a grammar difficulty level.

7. A method, comprising:
collecting periodically, from one or more applications, one or more source texts for translation, wherein the one or more source texts are under development and are updates from one or more previously translated source texts;
providing, to a machine learning engine, source text properties associated with the one or more source texts;
generating, by the machine learning engine, a plurality of translation performance requirement predictions associated with a plurality of source segments of the one or more source texts respectively based on the source text properties;
based on the plurality of translation performance requirement predictions, generating, by the machine learning engine, a plurality of translation requests associated with the plurality of source segments for translation of the one or more source texts;
determining that the plurality of translation requests associated with the plurality of source segments exceeds a total daily word count limit determined by the machine learning engine based on a translation capacity learned by the machine learning engine to flatten a translation demand associated with a development time period of the one or more source texts under development;
in response to the determining that the plurality of translation requests associated with the plurality of source segments exceeds the total daily word count limit, providing on a future day, by the machine learning engine, the plurality of translation requests associated with the plurality of source segments;
receiving one or more translated texts generated in response to executing the plurality of translation requests; and
updating a translation result storage using the one or more translated texts.

8. The method of claim 7, further comprising:
generating, by the machine learning engine, a plurality of translator performance predictions associated with a plurality of translators respectively, wherein a first parameter of a first translation request includes a first translator for performing the first translation request.

9. The method of claim 8, wherein the first translator is a machine translation provider.

10. The method of claim 8, wherein the first translator is a human translator.

11. The method of claim 8, wherein a translation process parameter of the first translation request includes a first number of review cycles based on the plurality of translation performance requirement predictions and the plurality of translator performance predictions.

12. The method of claim 11, further comprising:
receiving, by the machine learning engine, feedback from the one or more review cycles; and
performing a training process, to the machine learning engine, based on the feedback.

13. A non-transitory machine-readable medium having stored thereon machine-readable instructions executable to cause a machine to perform operations comprising:
collecting periodically, from one or more applications, one or more source texts for translation, wherein the one or more source texts are under development and are updates from one or more previously translated source texts;
providing, to a machine learning engine, source text properties associated with the one or more source texts;
generating, by the machine learning engine, a plurality of translation performance requirement predictions associated with a plurality of source segments of the one or more source texts respectively based on the source text properties;
based on the plurality of translation performance requirement predictions, generating, by the machine learning engine, a plurality of translation requests associated with the plurality of source segments for translation of the one or more source texts;
determining that the plurality of translation requests associated with the plurality of source segments exceeds a total daily word count limit determined by the machine learning engine based on a capacity learned by the machine learning engine to flatten a translation demand associated with a development time period of the one or more source texts under development;
in response to the determining that the plurality of translation requests associated with the plurality of source segments exceeds the total daily word count limit, providing on a future day, by the machine learning engine, the plurality of translation requests associated with the plurality of source segments;
receiving one or more translated texts generated in response to executing the plurality of translation requests; and
updating a translation result storage using the one or more translated texts.

14. The non-transitory machine-readable medium of claim 13, wherein the operations further comprise:
generating, by the machine learning engine, a plurality of translation performance predictions associated with a plurality of translators respectively,
wherein a first parameter of a first translation request includes a first translator for performing the first translation request.

15. The non-transitory machine-readable medium of claim 14, wherein the first translator is a machine translation provider.

16. The non-transitory machine-readable medium of claim 14, wherein a translation process parameter of the first translation request includes a first number of review cycles.

17. The non-transitory machine-readable medium of claim 16, wherein the operations further comprise:
receiving, by the machine learning engine, feedback from the first number of review cycles; and
performing a training process, to the machine learning engine, based on the feedback.

18. The non-transitory machine-readable medium of claim 17, wherein a first source text property of the source text properties associated with a first source text includes an importance level of a page containing the first source text.

* * * * *